United States Patent
Williams

(10) Patent No.: US 7,134,113 B2
(45) Date of Patent: Nov. 7, 2006

(54) METHOD AND SYSTEM FOR GENERATING AN OPTIMIZED SUITE OF TEST CASES

(75) Inventor: Clay Edwin Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/286,880

(22) Filed: Nov. 4, 2002

(65) Prior Publication Data
US 2004/0088677 A1    May 6, 2004

(51) Int. Cl.
*G06F 9/44* (2006.01)
(52) U.S. Cl. ........................................ 717/106; 717/104
(58) Field of Classification Search ........ 717/104–107, 717/124–126, 132
See application file for complete search history.

(56) References Cited

U.S. PATENT DOCUMENTS

| | | | |
|---|---|---|---|
| 6,026,401 A * | 2/2000 | Brealey et al. ............. | 707/8 |
| 6,263,255 B1 * | 7/2001 | Tan et al. ................... | 700/121 |
| 6,505,342 B1 * | 1/2003 | Hartmann et al. .......... | 717/104 |
| 6,560,769 B1 * | 5/2003 | Moore et al. ............... | 717/100 |
| 6,804,634 B1 * | 10/2004 | Holzmann et al. .......... | 703/2 |
| 6,823,281 B1 * | 11/2004 | Friedman et al. ........... | 702/119 |
| 6,871,327 B1 * | 3/2005 | Polk ........................... | 715/856 |
| 2002/0120917 A1 * | 8/2002 | Abrari et al. ............... | 717/110 |
| 2005/0125769 A1 * | 6/2005 | McGovern et al. ......... | 717/102 |

OTHER PUBLICATIONS

Wikipedia definitions for 'Use case', 'Use case model', Unified Modeling Language, retrieved from <URL http://en.wikipedia.org> on Jan. 11, 2006.*
Briand, et al., A UML-Based Approach to System Testing, Carleton University Technical Report SCE-0101, Jun. 2001, 37 Pages.
Bousquet, et al., Conformance Testing from UML Specifications Experience Report, In Proceedings of the Workshop on Practical UML-based Rigorous Development Methods, pp. 43-55, 2001.
Pickin, et al., A UML-Integrated Test Description Language for Component Testing, In Proceedings of the Workshop on Practical UML-based Rigorous Development Methods, pp. 208-223, 2001.
UML Testing Profile RFP AD/Jul. 08, 2001, Object Management Group, UML Testing Profile Request for Proposal, OMG Document: AD/10/07/08, Jul. 16, 2001, 28 Pages.
Cohen, et al., The AETG System: An Approach to Testing Based on Combinatorial Design, IEEE vol. 23, No. 7, Jul. 1997, 17 Pages.
Amit Paradkar, Salt-An Integrated Environment to Automate Generation of Function Tests for APIS, In Proceedings of the 11th International Symposium on Software Reliability Engineering, pp. 304-316, 2000.

* cited by examiner

*Primary Examiner*—Mary Steelman
(74) *Attorney, Agent, or Firm*—Jesse L. Abzug, Esq.; McGinn IP Law Group, PLLC

(57) ABSTRACT

A method and system for generating an optimized suite of test cases includes deriving a set of use case constraints and generating a test suite based upon the set of use case constraints.

30 Claims, 10 Drawing Sheets

METHOD AND SYSTEM FOR GENERATING AN OPTIMIZED SUITE OF TEST CASES

BACKGROUND OF THE INVENTION

1. Field of the Invention

The present invention generally relates to a software design and development system for software testing. In particular, the present invention relates to a method and system for generating an optimized suite of test cases.

2. Description of the Related Art

When testing software systems, developing an effective and efficient test suite is a complex problem. A suite is effective if it thoroughly covers combinations of inputs, actions, and sequences of actions, enhancing the likeliness it will encounter defects in the software. A suite is efficient if it provides such coverage without unnecessary redundancy, which would unduly increase the testing effort.

Typically, when a tester tests a software system, the tester or test program takes an action against the system being tested and receives a result or response back from the tested system. The received result is compared against an expected result to determine if the system is working correctly. The tester then takes another action gets some other response and the tester performs a series of these action/response sequences. Sometime, the order of this sequence depends upon the responses which were received earlier in the sequence. The number of ways that the sequences may be combined is very large.

Also, for most actions where the tester stimulates the system in a step in the sequence, the number of potential inputs to that particular action is very large. So, there are at least two places where one runs into a large number of combinations which leads to a combinatorial explosion problem.

Test generation is an area in which significant research has been performed. Most of the prior research has focused on finite-state based testing, which uses a finite state representation of the system being tested to generate sequences of actions which may be used to test the system. The actions are determined by seeking to cover states, transitions between states, or some combination thereof. These methods suffer from problems dealing with combinatorial explosion. Also, these techniques are very hard to optimize from an internal state-based viewpoint.

Briand and Labiche explore system testing using Unified Modeling Language (UML) use cases (see L. Briand and Y. Labiche, A UML-based approach to system testing. Technical Report SCE-01-01, Carleton University, June 2001). However, their published work to date focuses on use case dependency sequences, requirements derivation from sequence diagrams, and variant sequence derivation. That work does not address optimization or test generation problems.

Other applications of UML to testing include developing a UML-based representation for automating test generation for distributed systems, protocol conformance testing (L. Du Bousquet, H. Martin, and J.-M. Jezequel, Conformance testing from UML specifications experience report. In Proceedings of the Workshop on Practical UML-based Rigorous Development Methods, Toronto, CA, 2001, 43–55), component testing (S. Pickin, C. Jard, T. Heuillard, J.-M. Jezequel, and P. Desfray. A UML-integrated test description language for component testing. In Proceedings of the Workshop on Practical UML-based Rigorous Development Methods, Toronto, CA, 2001, 208–223), and the development of a standard representation in UML for describing conformance test cases (UML testing profile: Request for proposal, 2001, OMG document: AD/01-07-08. This work also does not address optimization of generation problems.

An additional difficulty in finite-state based test generation is model representation. Because the coverage focus of the test generation method is on system state, models often require a very high degree of detail and can be difficult to construct. The method described herein is based on the possible actions a system provides. This yields a much simpler model than many finite state-based methods.

SUMMARY OF THE INVENTION

In view of the foregoing and other problems, drawbacks, and disadvantages of the conventional methods and structures, an aspect of the present invention is to provide a method and structure which generates an optimized system of test suites.

In a first aspect of the present invention, a method for generating a test suite includes deriving a set of use case constraints and generating a test suite based upon the set of use case constraints.

In a second aspect of the present invention, a system that generates a test suite includes a deriver that derives a set of use case constraints and a generator that generates a test suite based upon the set of use case constraints.

In a third aspect of the present invention, a signal-bearing medium tangibly embodying a program of machine-readable instructions executable by a digital processing apparatus to perform a method of generating a test suite, includes deriving a set of use case constraints and generating a test suite based upon the set of use case constraints.

An exemplary embodiment of the invention minimizes the number of test cases that guarantees a certain level of coverage of potential operations and sequences and takes into account both of those places where combinatorial explosions may occur, a test case being a sequence of these operations. A tester can typically say that one wants to make sure that one tests all values with every other value and tests all of these basic sequences, but might not understand how to perform that testing. The present invention provides the ability to perform that test.

In contrast to the internal, state-based view taken by conventional test systems, the present invention takes the point of view of the tester. In other words, the present invention uses an action based (or use based) view as opposed to a state based view in order to generate a tester. Although, an exemplary embodiment may monitor a state of the tested system, the present invention does not rely upon the state to form the coverage criteria. Rather, the present invention covers the actions and sequences.

The inventor developed an exemplary embodiment of the invention which uses a combinatorial optimization algorithm to produce test suites that are effective and efficient. These suites are effective because they completely cover all specified combinations and sequences and they are efficient because they minimize the size of the test suites that they generate.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
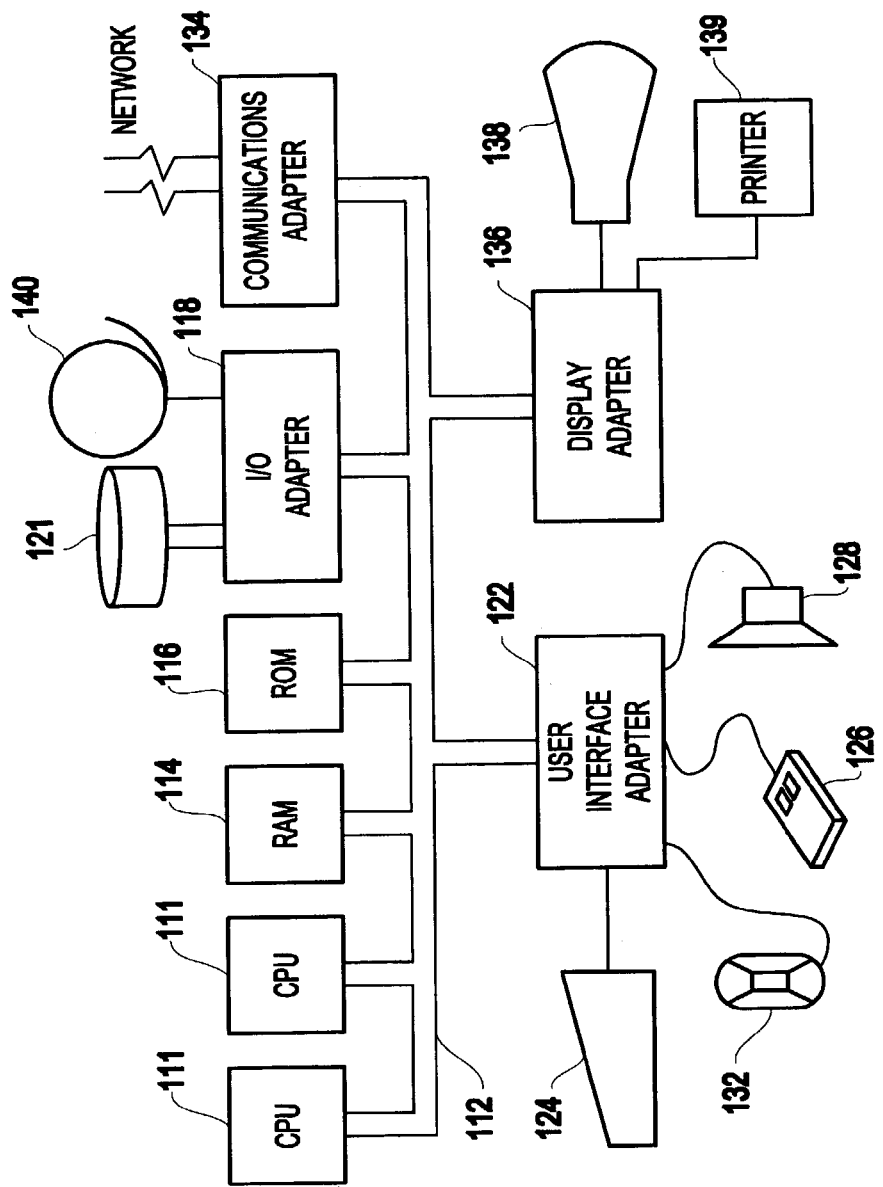
FIG. 1 illustrates an exemplary hardware/information handling system 100 for using and incorporating the present invention therein.
Figure 2:
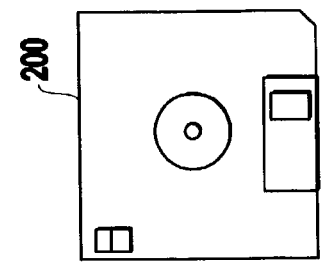
FIG. 2 illustrates a signal bearing medium 200 (e.g., storage medium) for storing steps of a program of a method according to the present invention.

Referring now to the drawings, and more particularly to FIGS. 1–18, there are shown preferred embodiments of the method and structures according to the present invention.

An exemplary embodiment of the invention may take advantage of an open standard modeling language called the Unified Modeling Language (UML.) This embodiment may parse the UML to generate a use case flow graph (described below) which may be used to generate the optimized test suites.

An exemplary embodiment of the present invention uses the concept of a use case which defines a piece of functionality which is of interest to a user. In other words, the use case presents the tested system in a manner which is similar to a user view of that system. For example, in a word processor a user might want to save a file. The user thinks, "I am going to save a file." Thus, "save file" becomes a use case. A use case may include several steps. In this example, the user might click "save as", type the filename and then click "OK." The system might respond with "That file name already exists, do you want to overwrite it?" and the user responds "Yes." Thus, there are many operations that might happen for a particular use case. Those steps are actions within the use case.

There is a another concept called an Actor. In a real system, there may be many actors. Examples of actors may include a system administrator, a regular user and a customer. Different actors often have permission to only use certain subsets of use cases. Those subsets may overlap. Therefore, while optimizing over a use case flow graph, one also may want to account for the functionality for each actor. In this manner, one may ensure complete testing from the perspective of each actor.

An exemplary embodiment of the invention also uses the concept of test case which is a higher level construct than the use case. A test case is a sequence of use cases. Each use case has an outcome that may affect the state of the system and may also provide some feedback to a user. As an example, in the "save file" use case, the feedback to the user may be "file saved." Thus, the state of the system is reflected in the fact that the file was saved.

There are at least two places where optimization may occur. For a given use case, there are usually many different types of input that can go into a use case. For example, in a use case for logging into a system, typically there are two types of input: username and password. The username can be valid or invalid and the password can be valid or invalid in a logical sense. Thus, there are four possible combinations in this example. Other use cases may have many more inputs and each input may have several logical possible values. Therefore, there may be a very large set of possible inputs.

An exemplary embodiment may use existing technology to optimize the combinations of inputs into an action or a use case. An example of such technology is the AETG tool, the details of which can be found in D. M. Cohen, S. R. Dalal, M. L. Fredman, and G. C. Patton, The AETG system: An approach to testing based on combinatorial design. IEEE Transactions on Software Engineering, 23(7), 1997, 437–444. These systems generate a set of variations which are needed to test a given use case properly. These variations are based on input from the tester that describes the desired amount of coverage. This input is typically contained in the model.

An exemplary set of variations is shown in Table 1 below. A set of variations is generated for each use case. As shown for example in FIG. 4, a use case flow graph represents each use case as a node and potential flows from one use case to another as edges. The numbers in each use case node represent the number of rows in the variation table. This number is known as the "coverage number." Therefore, if one visits that use case a number of times which is at least equal to the coverage number for that use case and one uses each of the variations for that use case then one should have good coverage of the use case according to what a tester has indicated.

An exemplary embodiment of the invention determines the best way to sequence the use cases so that they are not visited any more than necessary but ensures that use case is visited at least a number of times equal to that use case's coverage number. The non-trivial nature of this problem is demonstrated by the following example. A particular use case "A" may have a coverage number of 12 and somewhere along a path, several edges away, another use case "B" may have a coverage number of 40 and somewhere in another path there may be a use case "C" having a coverage number of 4. But if one looks at the neighbors nearest to use case "A" along the path to use case "B", one might see it has a coverage number less than that of the nearest neighbor on the path to use case "C". The issue is that one wants to proceed down the path toward use case "B" more than toward use case "C." However, if one just bases decisions upon the nearest neighbor to use case "A", one is not going to optimize the test suite. An exemplary embodiment of the invention provides an analysis of all coverage numbers and will always make the best global choice to generate an optimized test suite.

The state of the system might affect which use cases are eligible for execution at any point in time. An exemplary embodiment of the invention incorporates this concept through the use of pre- and post-conditions. For example, when one is at a use case "A" and there are two use cases "B" and "C" and use case "B" requires a state that the system is not in, then one does not want to traverse the edge to use case "B." An exemplary embodiment of the invention uses these pre- and post-conditions and also incorporates a "blackboard" concept to capture states which enables intelligent flow choices. Optimization also requires the notion of a modal structure. A graph with modal structure makes it possible to solve this optimization problem such that the optimized graph is only going to include feasible paths given the state of the system.

FIG. 1 illustrates a typical hardware configuration of a system 100 for generating an optimized system of test suites in accordance with the invention and which preferably has at least one processor or central processing unit (CPU) 111.

The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting an information handling system to a data processing network, the Internet, an Intranet, a personal area network (PAN), etc., and a display adapter 136 for connecting the bus 112 to a display device 138 and/or printer 139 (e.g., a digital printer or the like).

In addition to the hardware/software environment described above, a different aspect of the invention includes a computer-implemented method for performing the methods described below. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising a signal-bearing medium tangibly embodying a program of machine-readable instructions executable by a digital data processor incorporating the CPU 111 and hardware above, to perform the method of the invention.

This signal-bearing medium may include, for example, a RAM contained within the CPU 111, as represented by the fast-access storage for example. Alternatively, the instructions may be contained in other signal-bearing media, such as a magnetic data storage diskette 200 (FIG. 2), directly or indirectly accessible by the CPU 111.

Whether contained in the diskette 200, the computer/CPU 111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

As systems deliver increasingly large sets of functional capabilities, developing efficient and effective test suites for testing these capabilities can be a challenging task. An exemplary embodiment of the present invention provides a representation based on standard UML use cases which can be used for testing system functionality. The representation is called a Constrained Use Case Flow Graph (hereinafter "CUCFG").

One of the goals of system testing is to verify that the system's functional capabilities can be combined to support the business processes for which the system was designed (see B. Beizer. Software Testing Techniques. New York: van Nostrand Reinhold 2nd Edition, 1990). This goal poses two significant challenges: (1) The tester should efficiently execute sequences of the system's functional capabilities; and (2) The tester should cover significant variations within each functional capability as they are sequenced. Because both of these challenges involve selecting test cases from a very large combinatorial space, an automated approach is needed. Use cases, which describe the functionality that a system provides to its users, can serve as a basis for effective and efficient system testing.

An exemplary embodiment of the present invention addresses these issues using a representation called a Constrained Use Case Flow Graph (CUCFG). This representation supports all standard constructs from the Unified Modeling Language (UML) as well as additional formal constructs required to perform test generation. The test suites generated by an exemplary embodiment of the present invention achieves a tester specified level of coverage while minimizing the number of use case instances which may be required to test the system.

Use cases may be defined as "a coherent unit of functionality" provided by a system for one or more actors (see J. Rumbaugh, T. Jacobson and G. Booch, The Unified Modeling Language Reference Manual, Reading, Mass., Addison-Wesley, 1999). An actor is an external entity which uses the system. For a thorough introduction to use cases in UML, see F. Armour and G. Miller, Advanced Use Case Modeling: Software Systems, Reading Mass., Addison-Wesley, 2001.

Figure 3:
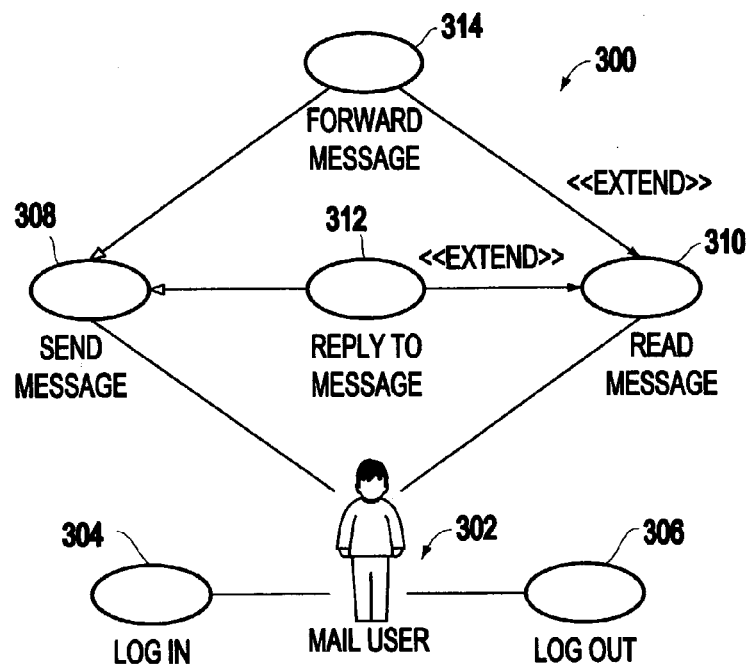
FIG. 3 shows an exemplary use case diagram 300 for an electronic mail ("email") program in accordance with the invention.

FIG. 3 illustrates an exemplary use case diagram 300 for an e-mail program. There is one actor in this diagram, which is the Mail User 302. There are six use cases in the model: Log In 304, Log Out 306, Send Message 308, Read Message 310, Reply to Message 312, and Forward Message 314. Forward Message 314 and Reply to Message 312 are both related to Read Message 310 by an <<extend>> association. This is because these two use cases can be conditionally instantiated when the Mail User 302 is reading a message. Also, both Forward Message 314 and Reply to Message 312 specialize Send Message 308, because they are a more specific type of sending an e-mail.

In order to correctly describe sequences of use cases, an exemplary embodiment of the invention uses a mechanism to describe the conditions under which a use case may be instantiated. Instantiation (also called "invocation") refers to executing a particular use case using specific inputs. The conditions for correctly instantiating use cases are captured as a precondition of the use case. The precondition is a set of constraints on the system state that must be true for the use case to be triggered. Similarly, a postcondition is a set of constraints on the system state after the use case has completed. Given a use case u, P(u) is the precondition associated with u and Q(u) is the postcondition belonging to u.

An exemplary method in accordance with the invention assumes that a tester has a mechanism for determining a set of variations that would be used to thoroughly test each use case. Again, an example of such a tool is the AETG tool, described in the above mentioned D. M. Cohen, et al. article. For a given use case, a set of variations similar to those shown in Table 1 is generated. For use case u, the set of variations is denoted V(u). The number of variations |V(u)| is the coverage number for u.

TABLE 1

| ToList | CcList | BccList | Subject | Body |
|---------|---------|---------|---------|---------|
| empty | empty | empty | present | empty |
| empty | empty | present | present | present |
| empty | present | empty | present | present |
| empty | present | present | empty | present |
| present | empty | empty | present | empty |
| present | empty | present | empty | empty |
| present | present | empty | empty | empty |
| present | present | present | empty | present |

Complex functionality in a system, such as a business transaction, is typically a sequence of use cases. A Use Case Flow Graph (UCFG) makes sequences of use cases explicit as a directed graph G=(U,A) with the use cases U as nodes and an arc set A which represents the flow from one use case to another (see C. E. Williams and A. Paradkar., Efficient regression testing of multi-panel systems. In Proceedings of the 10th International Symposium on Software Reliability Engineering, Boca Raton, Fla., 1999, 158–165). The optimization/generation technique of an exemplary embodiment of this invention uses this representation augmented with the following concepts:

1) Use cases which can serve as starting points in a use case sequence belong to the set I of "initial" use cases;

2) Use cases which can terminate a use case sequence belong to T, the set of "terminal" use cases; and 3) There is a "dummy" node $u_0$ in the use case set. The arc set has arcs $(u_0, u_i)$ for each $u_i \in I$ and $(u_j, u_0)$ for each $u_j \in T$.

Figure 4:
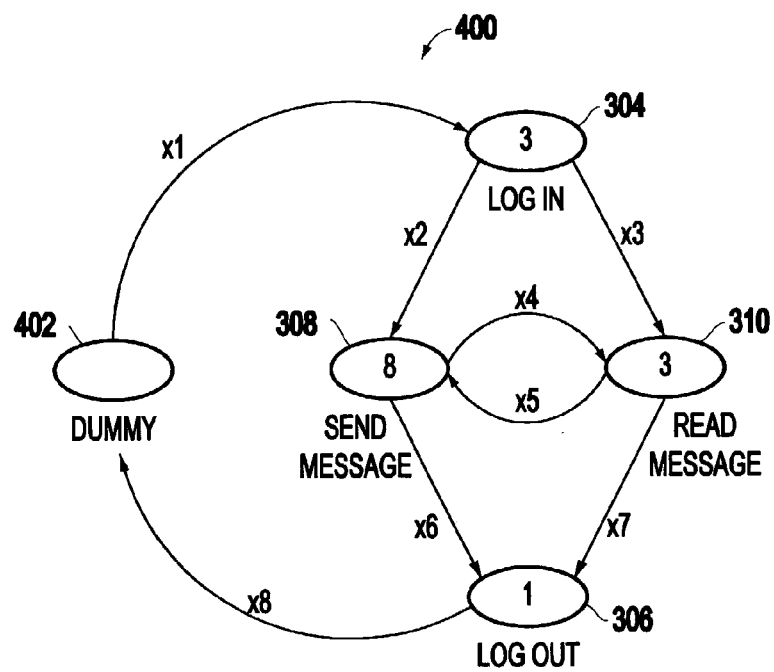
FIG. 4 shows the constrained use case flow graph 400 for the email program of FIG. 3 in accordance with the invention.

Such a representation is termed a Constrained Use Case Flow Graph (CUCFG). FIG. 4 shows a representative CUCFG 400 for the mailing system example described earlier. Each use case is labeled with its coverage number (for example "3" for the login user case), and the arcs are labeled with variables x1–x8 which will be used in the optimization derivation. As explained above, the coverage number is derived using the variation set for each use case (an example of which is shown in Table 1). The Forward Message 314 and Reply to Message 312 use cases are not shown in the remaining Figures, as they occur as extensions to Read Message 310. FIG. 4 also shows the dummy node 402 which connects between the initial use case, "Login", 304 and the terminal case, "Logout", 306.

The optimization strategy used by an exemplary embodiment of the invention is based on determining how many times each arc between two use cases should be traversed given a set of coverage variations that must be exercised. In the approach outlined below, the CUCFG should have a specific structure. This structure allows the optimization technique to produce an optimized graph that will support test case generation when the model is consistent. This form is termed a "modal structure".

Figure 5:
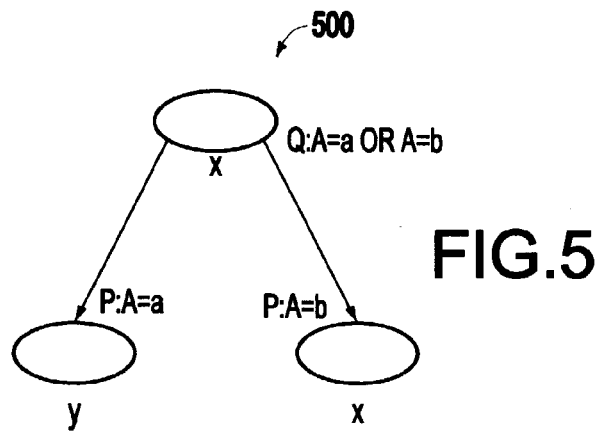
FIG. 5 illustrates a constrained use case flow graph fragment 500 which has a modal structure in accordance with the invention.

Definition 1 A CUCFG G=(U,A) has modal structure iff $\forall (u_i, u_j) \in A$
1. $Q(u_i)$ and $P(u_j)$ are in disjunctive normal form.
2. $\pi(u_j) \subseteq \mu(u_i)$, where $\pi(u_j) = \{$clauses in $P(u_j)\}$ and $\mu(u_i) = \{$clauses in $Q(u_i)\}$ Given a modal graph and a test variation on $u_i$, which leads to a particular set of constraints being satisfied in $Q(u_i)$, one can determine statically and easily whether or not $u_j$ can be triggered. FIG. 5 illustrates a CUCFG fragment 500 which has a modal structure.

The input to the optimization and generation technique is a modal CUCFG G=(U,A), the set of actors associated with the use cases, and the <<include>> and <<extend>> associations between use cases. An aspect of the optimization is to determine the optimal way to traverse the CUCFG such that every variation in each use case is used at least once, each arc is traversed at least once, and the total testing effort is minimized. The assumption is that covering the variations once is adequate, because they are generated in a manner that guarantees they are sufficient to completely test the use case. That is the case with an exemplary embodiment of the invention, provided that the constraints are captured correctly.

The total effort associated with executing a test suite is determined by the total number of use case invocations that exist in the suite of test cases. This is the quantity that should be minimized. In order to easily describe the optimization problem, the following notation will be used.

Definition 2 For a use case node $u_i$:

$$\omega^-(u) = \{a \in A | a = (u_j, u)\} \text{ and } \omega^+(u) = \{a \in A | a = (u, u_k)\} \quad (1)$$

Optimization can be seen as taking the coverage number |V(u)| for each $u \in U$ and determining how it should be distributed on the edges in $\omega^+(u)$. This leads to a coverage number C(a) for each arc $a \in A$. Given this notation, the objective function is:

$$\min_{u \in U \setminus \{u_0\}} \sum_{a \in \omega^-(u)} C(a) \quad (2)$$

For the CUCFG in FIG. 4, the objective function would be $$\min \sum_{i=1}^{7} C(x_i) \quad (3)$$

Given this objective function, one may consider four types of constraints on the optimization problem: use case coverage constraints, flow constraints, actor related constraints, and pre- and postcondition related constraints.

A use case coverage constraint guarantees that each use case is instantiated a sufficient number of times for each variation associated with the use case to be used at least once. Therefore:

$$\sum_{a \in \omega^-(u)} C(a) \geq |V(u)|, \forall u \in U \quad (4)$$

The following use case coverage constraints apply to the CUCFG in FIG. 4.

$$x_1 \geq 3 \quad (5)$$

$$x_2 + x_5 \geq 8 \quad (6)$$

$$x_3 + x_4 \geq 3 \quad (7)$$

$$x_6 + x_7 \geq 1 \quad (8)$$

Flow constraints state that each time one enters a use case, one should also leave it. Therefore:

$$\sum_{x \in \omega^-(u)} C(x) = \sum_{y \in \omega^+(u)} C(y), \forall u \in U \quad (9)$$

These constraints are equivalent to applying Kirchoff's law to the CUCFG. For the mail example shown in FIG. 4, the flow constraints would be as follows.

$$x_1 = x_2 + x_3 \quad (10)$$

$$x_2 + x_5 = x_4 + x_6 \quad (11)$$

$$x_3 + x_4 = x_5 + x_7 \quad (12)$$

$$x_6 + x_7 = x_8 \quad (13)$$

$$x_1 = x_8 \quad (14)$$

Figure 6:
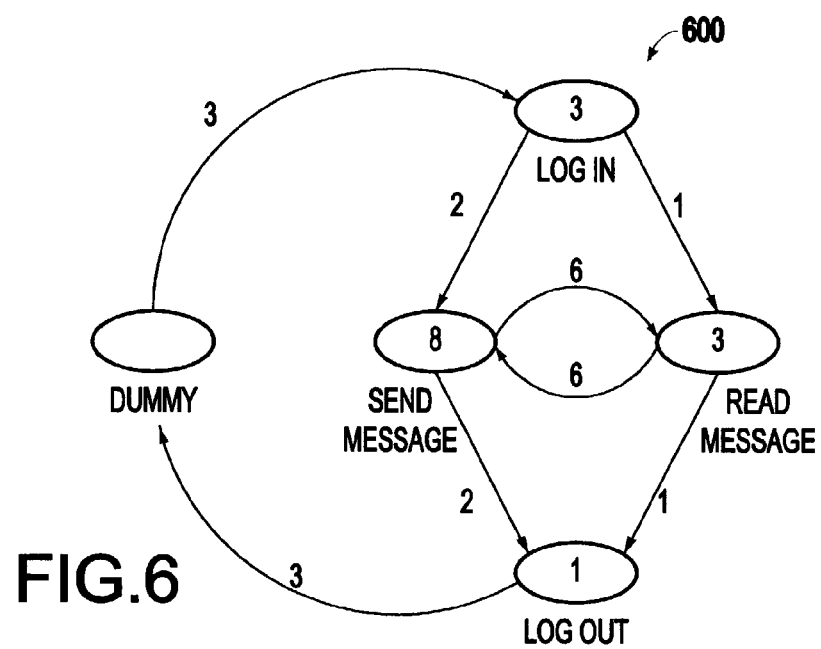
FIG. 6 shows an instantiated constrained use case flow graph 600 for the email program of FIG. 3 in accordance with the invention.

As shown in FIG. 6, the main CUCFG 600 is a composite view of all the possible sequences through the use cases that a system can support using all defined actors. However, the various actors might only use a subset of the sequences, determined by the set of use cases with which an actor is associated. Given a CUCFG G=(U,A) and an actor X, let $U_X$ be the set of use case from U with which X is associated. Define:

$$A_X = \{a | a \in A \wedge a = (u_i, u_j) \wedge u_i, u_j \in U_X\} \quad (15)$$

which means that each actor imposes a subgraph CUCFG $$G_X = (U_X, A_X) \quad (16)$$

For each actor X and its associated subgraph $G_X$, one should ensure two things. First, one should guarantee that the flow constraints hold in the subgraph. Second, one should make certain that the weight function C on the arcs in A are distributed in such a way that the composite view can correctly be decomposed to a valid set of subgraphs associated with the actors. This is done using a technique called "arc splitting." It is applied to each arc in the composite CUCFG which is associated with more than one actor. For example, if arc $x_i$ from G is associated with two actors I and J, then it is split into two subedges $x_i^I$ and $X_i^J$. The arc splitting constraint then requires:

$$x_i = x_i^I + x_i^J \quad (17)$$

To generalize this, let $\Gamma = \{I_1, I_2, \ldots, I_m\}$ be the set of actors associated with G=(U,A). For an arc $x_j \in A$. Define:

$$\Gamma(x_j) = \{I \in \Gamma | x_j \in A_I\} \quad (18)$$

which is the set of actors for which the edge $x_j$ is possible (meaning that both the source and target use cases of $x_j$ are in $U_I$.) The general arc splitting constraint will be:

$$\sum_{I \in \Gamma(x_j)} x_j^I = x_j \quad (19)$$

A set of pre- and post-condition constraints should be used to ensure that, for a use case u, the distribution of the coverage number |V(u)| across the arcs in $\omega^+(u)$ is consistent with the preconditions on the target use cases of these arcs. This constraint leads to the suggestion that the CUCFG be modal. Given a use case u and a specific input to u from its variation set V(u), a subset of the clauses in Q(u) will be asserted. Suppose there are k such subsets for the entire set of inputs V(u), $Q^V(u) = \{q_1, q_2, \ldots, q_k\}$. For each $q_i \in Q^V(u)$, let $N(q_i)$ be the number of variations in V(u) that results in $q_i$ being asserted, and define:

$$\Omega(q_i) = \{(u,v) | (u,v) \in \omega^+(u) \wedge \pi(v) \subseteq q_i\}. \quad (20)$$

The pre- and postcondition constraint that must hold on each use case $u \in U$ is $$\sum_{x \in \Omega(q_i)} x \geq N(q), \forall q_i \in Q^V(u) \quad (21)$$

Optimizing a CUCFG described above requires solving an integer linear programming (ILP) problem. For a given CUCFG G=(U,A) and actor set $\Gamma = \{I_1, I_2, \ldots, I_m\}$, the number of variables in the ILP is O(m|A|). The number of constraints is O(m|U||P|), where P is the number of different preconditions present throughout the CUCFG. Although the problems are of significant size, and ILP is an NP-hard problem, the technique has been tractable for all problems that the inventor has tried to date.

The inventor has used the IBM Optimization Subroutine Library (OSL) to solve the ILP problem and produce an optimized CUCFG (see M. S. Hung, W. O. Rom, and A. D. Waren, OSL: Optimization with IBM OSL. Danvers, Mass., Boyd and Fraser, 1994). OSL uses sophisticated branch and bound techniques to solve ILP instances. The edges in the optimized CUCFG are labeled with a coverage number, indicating the number of times that each edge should be traversed. FIG. 6 shows the optimized CUCFG for the mail example.

Given an optimized CUCFG, test case generation is straightforward. This is because the optimized CUCFG is equivalent to a multigraph which contains K Euler tours, where:

$$K = \sum_{a \in \omega^+(v_0)} C(a) \quad (22)$$

This desirable property results from the fact that the indegree is equal to the outdegree on every node in the graph due to the flow constraints in (19), which enforced Kirchoff's law on each node. Any directed graph which has this property will be Eulerian.

In an exemplary embodiment, test case generation is accomplished in two phases. In the first phase, an exemplary embodiment of the invention simply determines K Euler tours on the graph. Each tour has a particular actor as its focus, which is supported by the actor constraints in the ILP. Once the tours have been determined, each use case in each tour is instantiated with a test variation. This should be done in such as way that the precondition on successor use cases are satisfied. The modal structure of the CUCFG guarantees that this can always be done provided the model is consistent. This generation can be performed using a basic greedy algorithm with backtracking.

Another exemplary embodiment of the invention is extended to address non-modal CUCFGs. In most cases, this can be done by introducing two types of pre/postconditions. The first type is related to use case sequencing, and should support the modality requirement. The second type is not sequencing related, and can be of any form. There are some cases where sequencing constraints are inherently non-modal. These cases will require the use of program analysis techniques to derive path (as opposed to arc) constraints for the optimization problem. The identification of the three types of problems (modal, mixed constraint, and non-modal) can be generalized by an approach that characterizes a set of problem types, each requiring a potentially more complex representations for optimization. This will lead to a set of testability patterns that could be used when building systems.

Fault models may also be used in conjunction with an exemplary embodiment of the invention. This exemplary embodiment essentially treats testing as a sampling problem, with the goal being thorough coverage of inputs and transitions across use cases. However, certain defects are unlikely to be detected this way. Fault model techniques can target such defects explicitly (A. Paradkar, SALT-an integrated environment to automate. generation of function tests for apis., In Proceedings of the 11th International Symposium on Software Reliability Engineering, San Jose, Calif., 2000, 204–316). Because they require that the generation algorithm should explicitly target each specific classes of faults being addressed, another exemplary embodiment of the invention uses a hybrid approach, combining the best techniques from both the sampling and fault model-based approaches.

Figure 7:
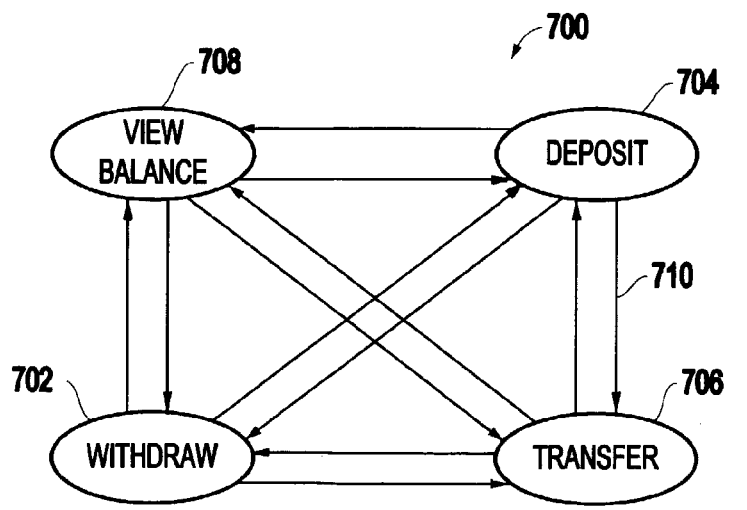
FIG. 7 illustrates an exemplary use case flow graph 700 for an ATM banking kiosk in accordance with the invention.

The following description provides an example of how an embodiment of the invention may be used with a banking system for an ATM kiosk. As shown in FIG. 7, the possible use cases are Withdraw 702, Deposit 704, Transfer Funds 706, and Balance Inquiry 708. The use cases 702–708 are presented as ovals in the diagram 700. Each use case has associated input parameters, and each parameter has associated partitions. Also, potential orderings between the actions are represented as arrows 710.

With an exemplary embodiment of the invention, two steps may be taken to generate the use case sequences to test the model.

Step 1: Identify the combinations of input that need to be tested on each use case. There are several well-known algorithms (e.g. the AETG algorithm) for doing this. An important consideration is to determine how many combinations will be needed.

For example, consider the Deposit use case. There are two input parameters: account and amount. Account has two values: checking and savings. Amount also has two logical values: valid and invalid. If one were interested in all combinations, this use case must be visited a total of four times. This is the coverage number for this action.

Step 2: Given the coverage number for each action, an optimization problem is devised and test sequences of use cases are generated.

Figure 8:
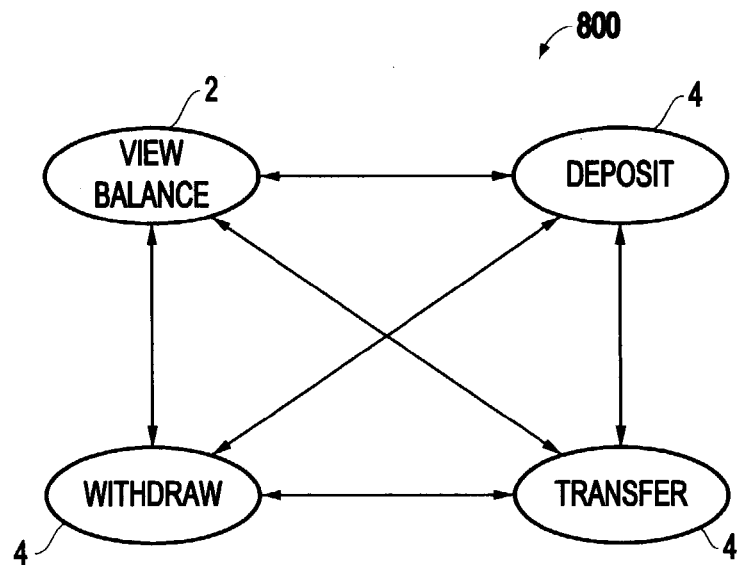
FIG. 8 illustrates a constrained use case flow graph 800 for the ATM banking kiosk of FIG. 7 in accordance with the invention.

Given the use case flowgraph 800, shown in FIG. 8, a series of constraints are generated that can be used to provide the optimal use case sequence. In an exemplary embodiment of the invention, there are two types of constraints: coverage constraints and flow constraints.

Figure 9:
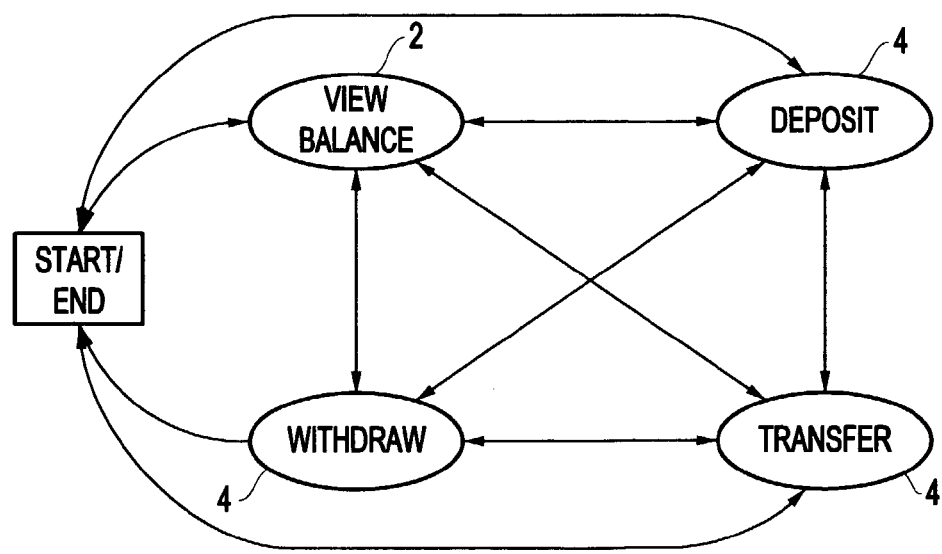
FIG. 9 shows another constrained use case flow graph 900 for the ATM banking kiosk of FIG. 7 in accordance with the invention.

To ensure complete testing one should visit each use case at least as many times as its coverage number requires. In this example, these are expressed as follows:

$C(\text{view balance}) \geq 2$ $C(\text{Deposit}) \geq 4$ $C(\text{Withdraw}) \geq 4$ $C(\text{Transfer}) \geq 4$ Flow constraints state that one should "exit" every action that one "enters". To specify this, a dummy starting/ending node should be added to the diagram as shown in FIG. 9.

Figure 10:
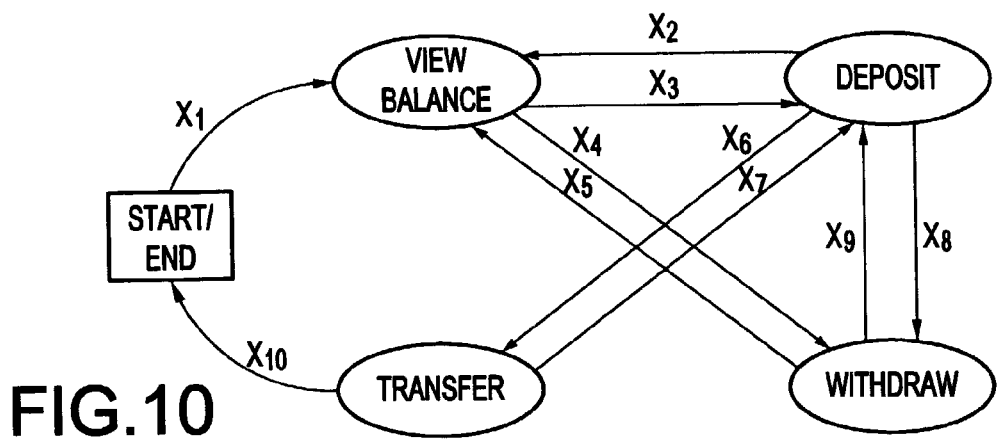
FIG. 10 shows yet another constrained use case flow graph 1000 for the ATM banking kiosk of FIG. 7 in accordance with the invention.

Thus, one sees that the use case sequence can start and end at any use case. The flow constraints are written using variables in the edges. To make the example easier to understand, FIG. 10 shows a limited subset of the edges.

Next, the flow constraints are collected and there is one for each node: Their form is inflow=outflow.

$$X1=X10; \qquad (23)$$

$$X1+X2+X5=X3+X4; \qquad (24)$$

$$X3+X7=X2+X6+X8; \qquad (25)$$

$$X4+X8=X5+X9; \text{ and} \qquad (26)$$

$$X6=X7+X10. \qquad (27)$$

Given the coverage and flow constraints, the invention minimizes the number of times the use cases are invoked, without sacrificing coverage quality. The coverage constraints ensure that each use case is invoked an appropriate number of times. In other words, the invention minimizes the total invocations, which is the sum of all the arrow labels.

Figure 11:
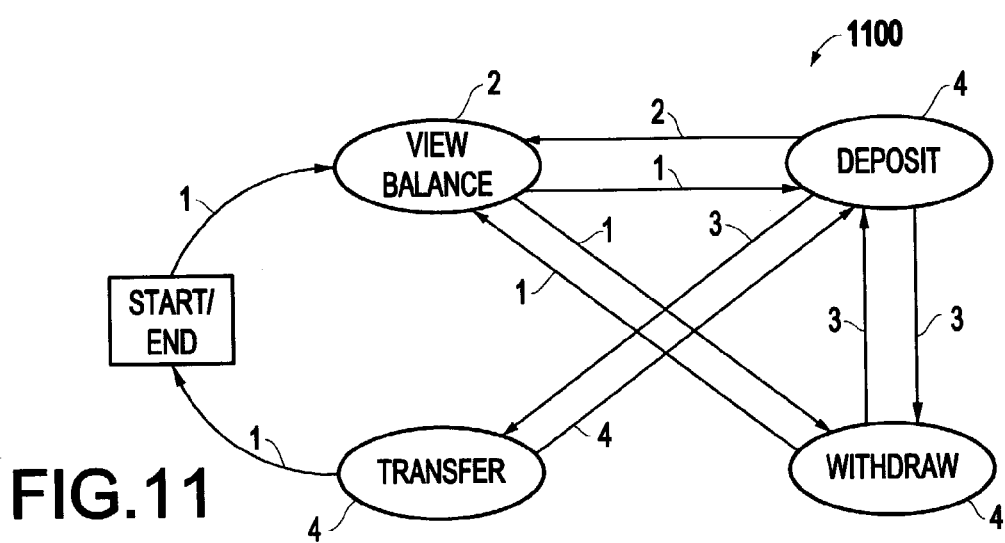
FIG. 11 shows an instantiated constrained use case flow graph 1100 for the ATM banking kiosk of FIG. 7 in accordance with the invention.

Solving the minimization problem subject to the constraints can be done using integer linear programming algorithms. Doing so yields an assignment of values to the arrow labels as shown in FIG. 11. In this example, one assumes $Xi \geq 1$.

Given the arrow labels, an embodiment of the invention tours the graph 1100 using the well-known Euler tour algorithm to generate the sequence of use case. At each step, the invention simply chooses the next untested input combination to arrive at a complete test strategy. For this example, the following is the optimal sequence of use cases: Start; View Balance; Withdraw; View Balance; Deposit; View Balance; Deposit; Withdraw; Deposit; Withdraw; Deposit; Withdraw; Deposit; Transfer; Deposit; Transfer; Deposit; Transfer; Deposit; Transfer; and End.

While this test does yield an optimal ordering action, it does not provide a way to constrain which actions are performed based on system state or history. We now describe another exemplary embodiment.

In this exemplary embodiment of the invention, the issue of constraints and history is handled by adding a global work area (or blackboard) that can be read/written by each use case. This provides the ability to "remember" what has already happened and use this information.

Figure 12:
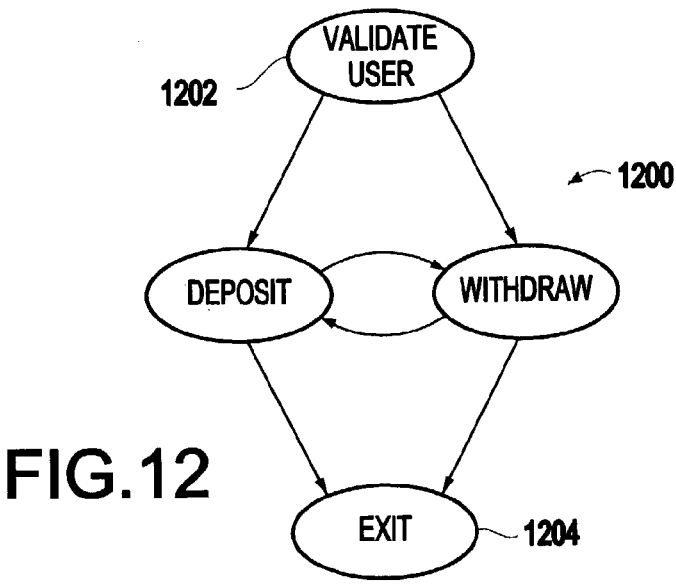
FIG. 12 illustrates an exemplary use case flow graph 1200 for a second ATM banking kiosk in accordance with the invention.

To see how this might be used, the inventor modified the ATM example slightly. In the real world, an ATM will not let a user perform any transactions until the user has been validated with the system. To model this, the inventor adds two new actions to our model 1200, as shown in FIG. 12: validate user and Exit. Validate user 1202 takes a card Number and PIN and verifies that the user can access the system. Exit 1204 logs off a user.

Figure 13:
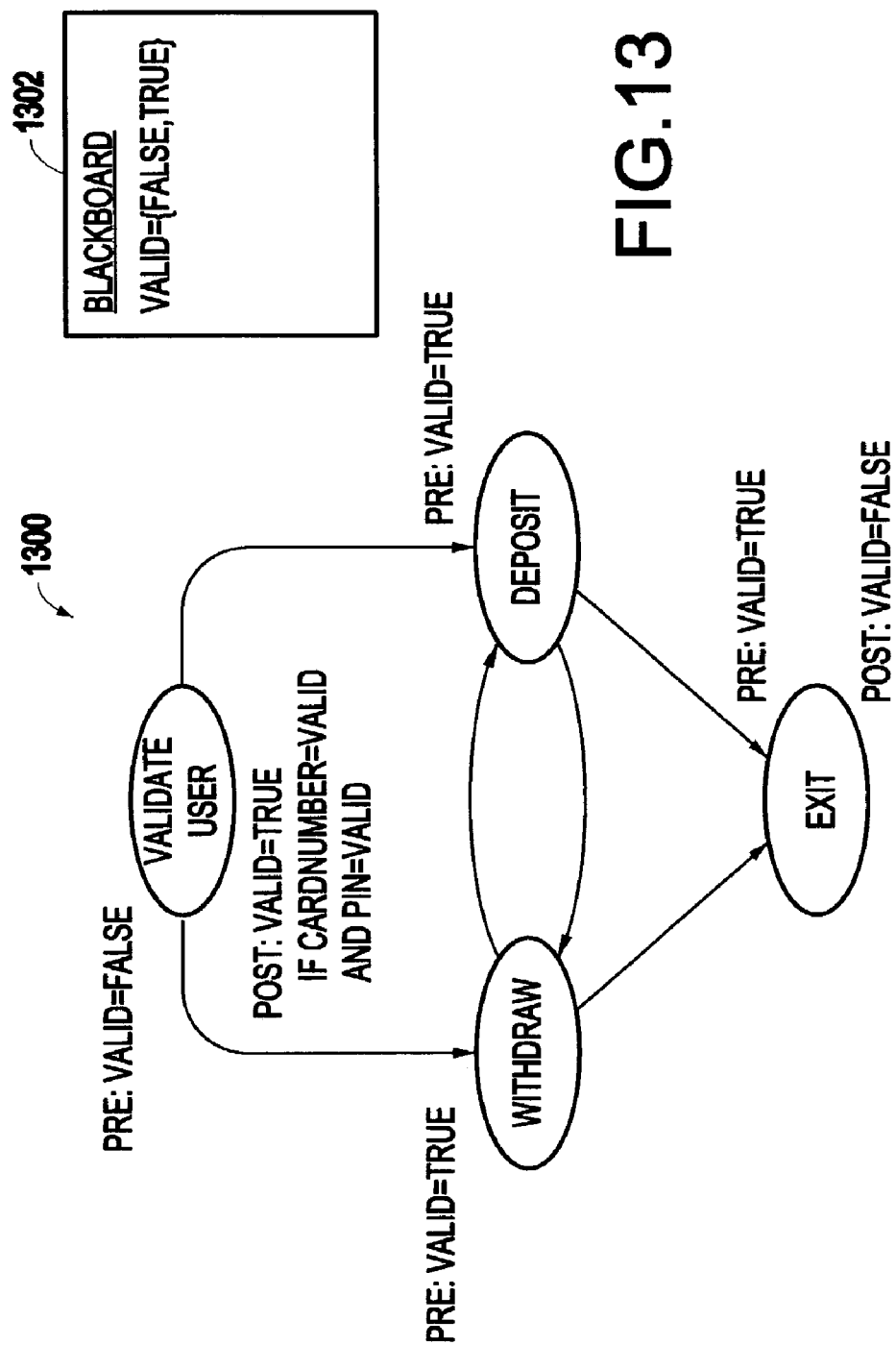
FIG. 13 shows a use case flow graph 1300 with a blackboard for the second ATM banking kiosk of FIG. 12 in accordance with the invention.

In the UCFG shown in FIG. 12, nothing prevents the system from generating a test case in which a user should log in with an invalid PIN and then withdraw. The "blackboard" provides a mechanism with which nonsensical sequences such as this are prevented. This also requires preconditions on use case that must be true for them to be invocable. Use cases also have postconditions that can update values on the blackboard. The UCFG with these additions is shown in FIG. 13.

What this flowgraph 1300 shows is that withdraw and deposit can only be performed if the variable valid is set to true on the blackboard 1302. This variable is only set to true if validate User is performed with a valid PIN and Card number.

Given this flowgraph 1300, the same principles outlined for the earlier example 1 apply. However, a nuance has also been introduced. Given the variations that should be tested for a given use case, certain combinations may require that a specific path be taken.

Figure 14:
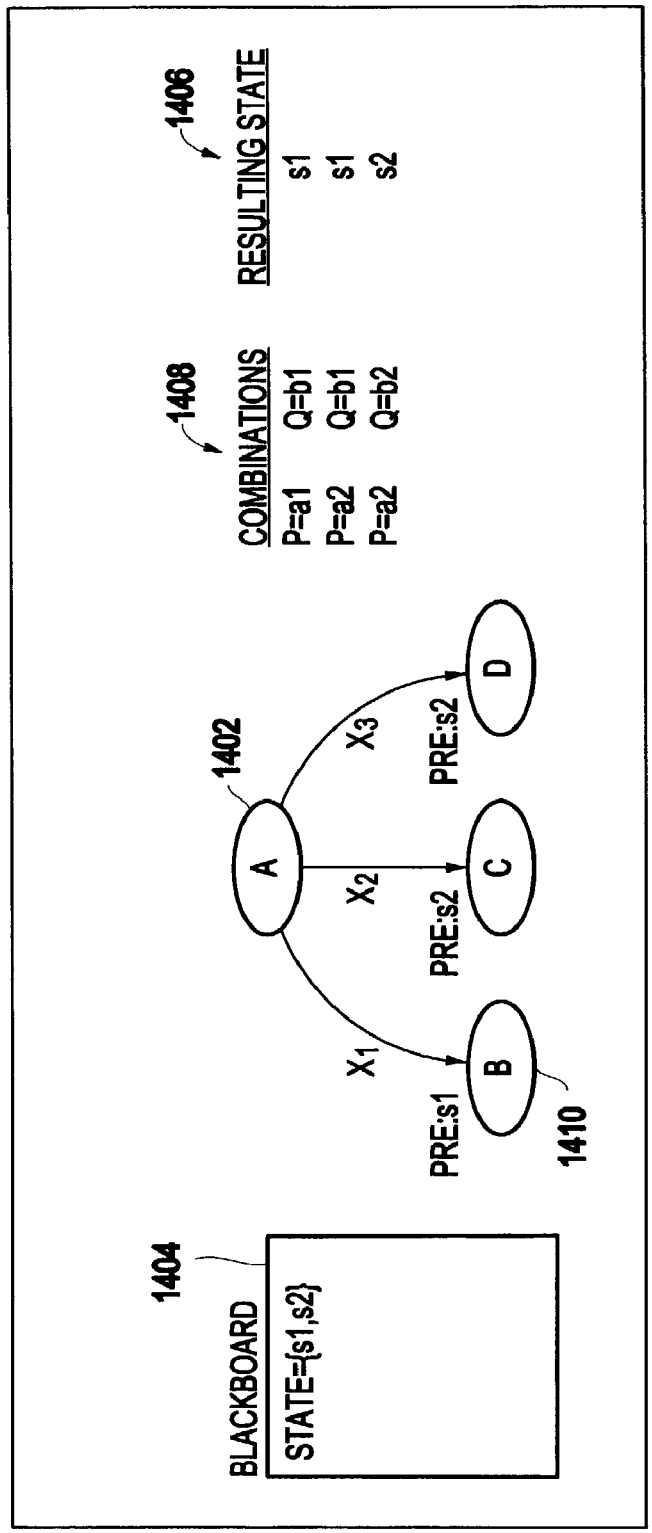
FIG. 14 shows yet another a use case flow graph 1400 with a blackboard to illustrate variation constraints in accordance with the invention.
Figure 15:
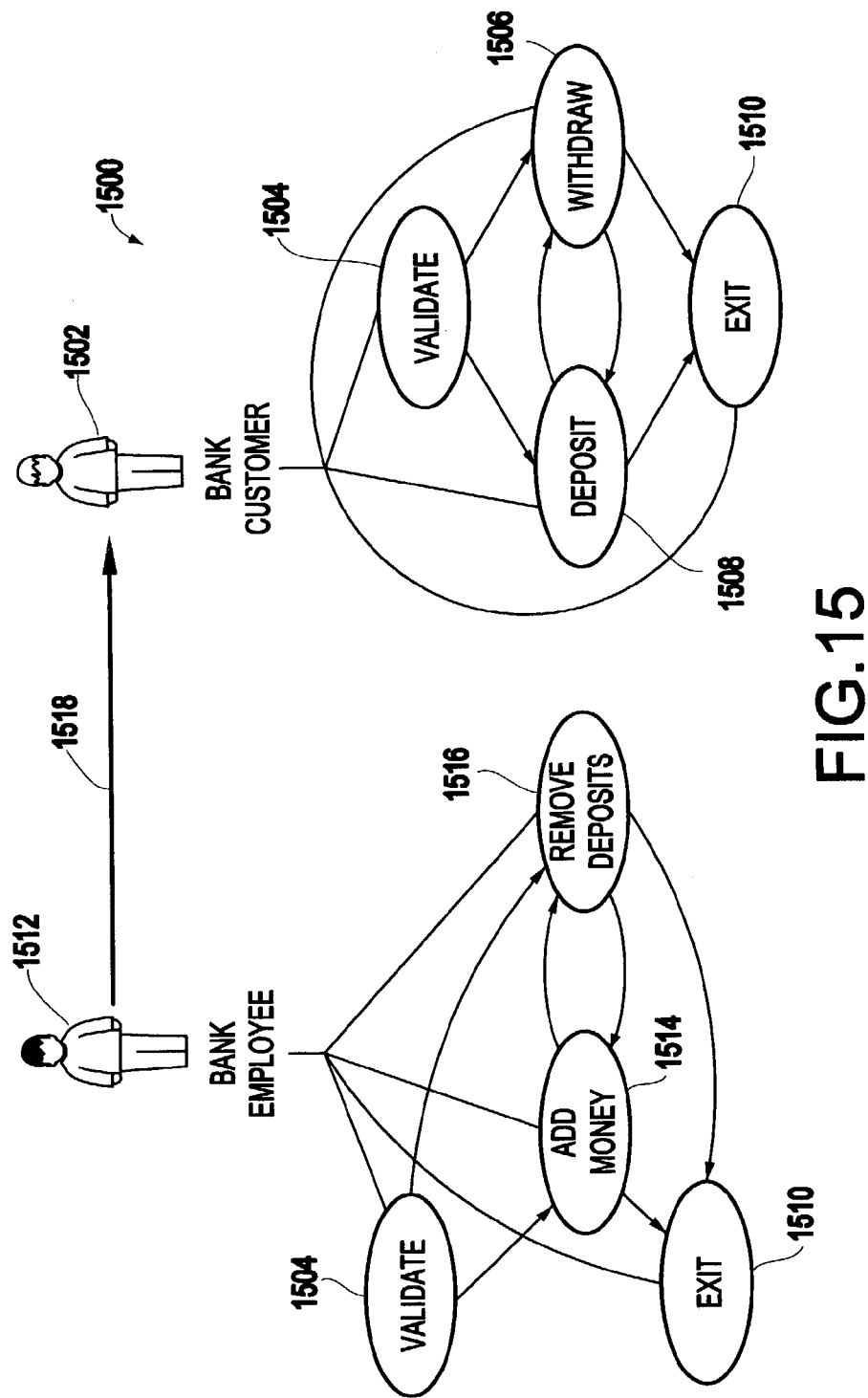
FIG. 15 shows a use case flow graph 1500 for a third ATM banking kiosk including actors in accordance with the invention.

For example, only the combination where both Card number and PIN are valid can lead to other transactions. The other combinations should lead only to trying to validate again. These requirements give rise to what the inventor calls pre/postcondition constraints. These can be introduced most easily by looking at a simple abstract example. Consider the use case as shown in FIG. 14:

In this example, use case A 1402 has three combinations to be tested. The resulting blackboard 1404 state 1406 associated with each combination 1408 is shown as well. The pre/postcondition constraints for this flowgraph are as follows:

$$X1 \geq 2 \tag{28}$$

$$X2 + X3 \geq 1. \tag{29}$$

These are understood as follows: Two of the combinations result in the blackboard 1404 being in state s1. Only one of the use cases which can follow use case A 1402 can be invoked when state=s1, and this is use case B 1410. Therefore, the edge from A–B must be traversed at least a sufficient number of times to accommodate the variations. Both A–C and A–D are reachable when the state is s2, so the sum of these edges must be large enough to accommodate the combinations where the state is s2.

Given the additional pre/postcondition constraints, the invention solves the optimization problem as explained above and the test suites are produced in the same manner.

Another idea to consider is when use cases may be classified according to the types of user that can invoke them. For example, a database administrator can often perform use cases that regular users cannot. Modeling these conditions is done by introducing Actors to the model, and adding constraints to see that one treats them consistently.

Suppose in our example, one has two types of Actors: Bank customer and Bank Employer. In addition to Validate User, Withdraw, Deposit, and Exit, one also now has Refill ATM and Remove Deposits. Finally, a Bank Employee can also be a Bank Customer. This yields the flowgraph 1500 shown in FIG. 15.

This flowgraph 1500 indicates that a customer 1502 can perform the use cases Validate 1504, Withdraw 1506, Deposit 1508, and Exit 1510. The Employee 1512 can perform: Add Money 1514 and Remove Deposits 1516 after validating 1504 and must Exit 1510. Finally, the arrow 1518 between Employee 1512 and Customer 1502 indicates that an employee may also be a customer and thus may perform any use cases a customer can.

To optimize the number of use cases that should be performed to test the system, the invention considers the actions as a whole set, but adds constraints to split them up (e.g., group them) correctly between the actors. The whole flowgraph 1600 is shown in FIG. 16.

Figure 16:
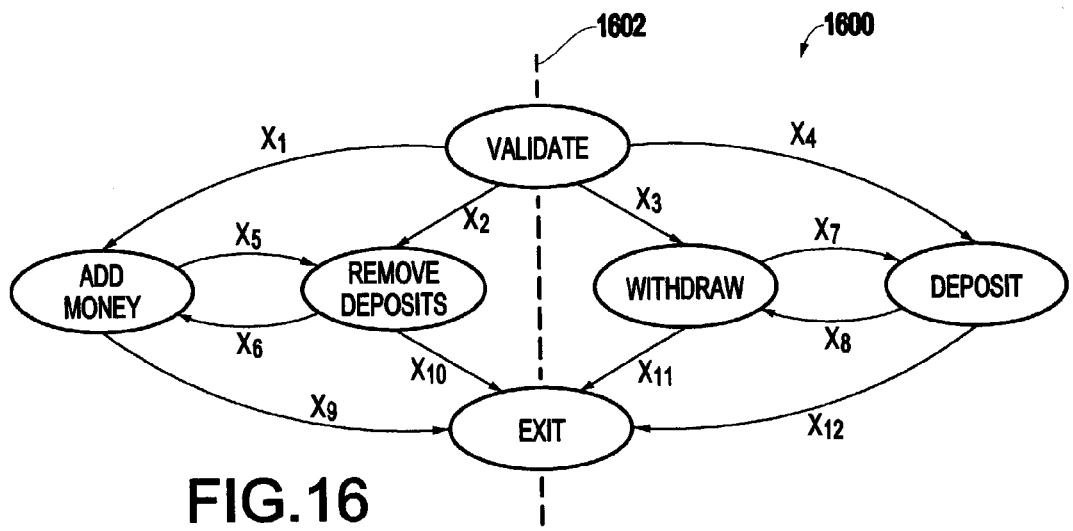
FIG. 16 shows a constrained use case flow graph 1600 for the third ATM banking kiosk of FIG. 15 in accordance with the invention.

In FIG. 16, it is assumed that use cases on the left hand side of the dotted line 1602 can only be done by an employee, while those on the right can be done by either an employee or customer. This is handled by an exemplary embodiment of the invention which uses two new types of constraints: Actor Equivalence and Actor Flow.

Figure 17A:
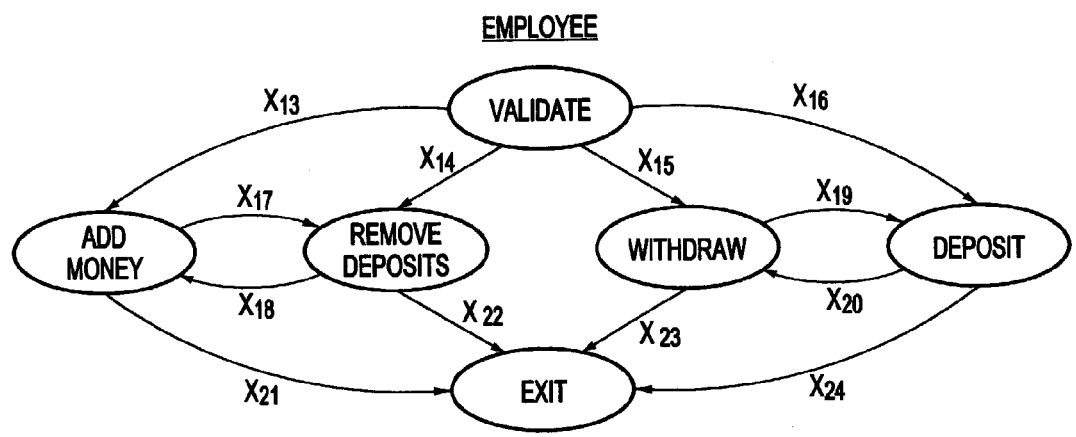
FIGS. 17A and 17B illustrates constrained use case flow graphs 1700 for each actor for the third ATM banking kiosk of FIG. 15 in accordance with the invention.
Figure 17B:
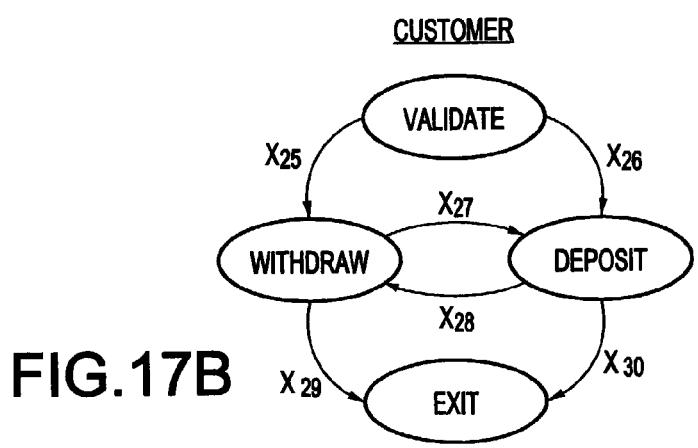

The constraints cross K+1 graphs in a model with K actors. The first graph is the combined graph 1600 shown in FIG. 16. Then there is a graph for each actor as shown in FIGS. 17A and 17B.

The Actor Flow constraints see that the use cases are exited each time they are entered. These are identical to the flow constraints on the main graph of FIG. 16. For example:

$$X15 + X19 = X20 + X23 \tag{30}$$

would be one of the constraints on the Employee actor.

The Actor Equivalence constraints provide connections between the individual actor graphs and the main graph to allow the invention to ensure that the total of the use case invocations balances. For example, both the Employee and the Customer have edges X15 and X25 into the withdraw action. The invention ensures that the sum of these two edges equals the total:

$$X15 + X25 = X3 \tag{31}$$

A constraint such as this is added for each edge in the main graph.

Given these two new constraints, an exemplary embodiment of the invention solves the optimization problem using the same techniques described above. The test suites are generated using the same algorithms, but applying them to each of the actor graphs.

In this example, the inventor outlines a family of models which can represent increasingly complex situations used to test a system. This embodiment of the invention identifies a set of constraints that can be used to convert the problem to the well known integer linear programming problem. The constraints and where they are applied are shown in Table 2.

TABLE 2

| Type | Form | Where |
|---|---|---|
| Coverage | $Xk \geq C(n)$ | Basic optimization |
| Flow | $Xk + Xm = Xn + Xe$ | Basic optimization |
| Variation | $Xk + Xj \geq N$ | Constrained actions or history |
| Equivalence | $Xk + Xj = Xm$ | Actors Introduced |
| Actor Flow | $Xk + Xj = Xn + Xe$ | Actors Introduced |

Figure 18:
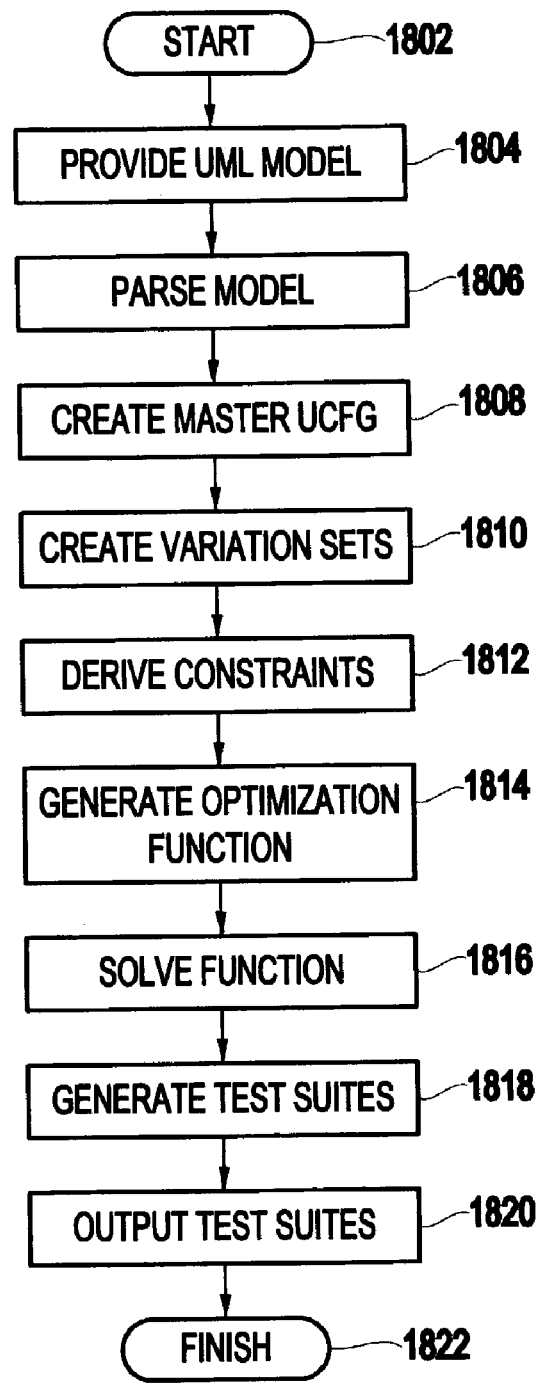
FIG. 18 is a flowchart illustrating an exemplary method 1800 for generating an optimized system of test suites in accordance with the invention.

FIG. 18 shows a flowchart in accordance with another exemplary method of the present invention. The flowchart starts at step 1802 and continues to step 1804 where the tester provides a UML model of the system to be tested. The system then continues to step 1806 where the system parses the UML model and continues to step 1808 where the system creases a master constrained use case flow graph and associated actor use case flow graphs. Next, in step 1810 the system creates variation sets from the UML model for each use case in the master flow graph and continues to step 1812. In step 1812, the system derives constraints. Those constraints may include: coverage constraints, flow constraints, actor constraints and pre/post-condition constraints as described above. Next, the system continues to step 1814 where an optimization function is generated based upon the master CUCFG and continues to step 1816 where the system solves the integer programming problem by satisfying the constraints while minimizing the optimization function. The system continues then to step 1818 where it generates a test suite based upon the solution to the optimization function and then continues to step 1820 where the system outputs the test suite. The flowchart ends at step 1822.

Although all of the graphs described above have been modal, as described in definition one, there may be two types of pre- and post-conditions, some of them may be making sure that one receives good sequences of use cases and those pre- and post-conditions need to be modal. However, other pre- and post-conditions may be related to updating the system state but have no affect on making sure that valid sequencing is performed. For example, in an ATM banking system if a customer makes a withdrawal the balance may be updated and, therefore, the state of the system may be altered, even though there may not be an affect upon what use case follows the withdrawal use case. Thus, "withdraw" is an example of a use case that has a non-modal post-condition. By contrast, a "log on" use case may include a flow edge directed to the withdraw use case, but the pre-condition for the use case is modal because the user must be logged on before the user may perform a withdraw use case. Therefore, the present invention is capable of handling both modal and non-modal use cases. However, these pre- and post-conditions should be defined as non-modal and modal sets so that an exemplary embodiment of the invention may generate the test suites based only upon the modal conditions.

While the invention has been described in terms of several preferred embodiments, those skilled in the art will recognize that the invention can be practiced with modification.

Further, it is noted that, Applicant's intent is to encompass equivalents of all claim elements, even if amended later during prosecution.

What is claimed is:

1. A method for generating an optimized suite of test cases comprising:
providing a use case model of the system to be tested;
parsing the use case model to generate a master use case flow graph and at least one use case flow graph,
creating a constrained use case flow graph based upon the use case model:
deriving, by a computer, a set of use case model coverage constraints; and
generating, by said computer, a minimal sized suite of test cases based upon the set of use case coverage constraints.

2. The method of claim 1 further comprising creating a variation set for each use case in the use case flow graph.

3. The method of claim 1, wherein the generating of the minimal sized suite of test cases comprises minimalizing the constrained use case flow graph.

4. The method of claim 3, wherein the generating of the minimal sized suite of test cases further comprises conducting a tour of the minimal sized constrained use case flow graph.

5. The method of claim 3, wherein the generating of the minimal sized suite of test cases further comprises conducting a Euler tour of the minimal sized constrained use case flow graph for each actor.

6. The method of claim 1, wherein the use case model comprises a Unified Modeling Language (UML) model.

7. The method of claim 1, further comprising creating a use case flow graph based on the use case model.

8. The method of claim 7, further comprising creating a variation set for each use case in the use case flow graph.

9. The method of claim 8, wherein the deriving comprises creating a constrained use case flow graph based upon the use case flow graph.

10. The method of claim 9, wherein the constrained use case flow graph includes a dummy use case connected by arcs to an initial use case and a terminal use case.

11. The method of claim 9, wherein the constrained use case flow graph includes a plurality of arcs between use cases.

12. The method of claim 11, wherein a number of arcs in the constrained use case flow graph ensures that every variation for each use case is used at least once and that each arc is traversed once.

13. The method of claim 9, wherein the creating a constrained use case flow graph comprises creating coverage constraints.

14. The method of claim 13, wherein the coverage constraints comprise a coverage number for each use case.

15. The method of claim 14, wherein each coverage number is based upon a set of variations for each corresponding use case.

16. The method of claim 9, wherein the creating a constrained use case flow graph comprises creating flow constraints.

17. The method of claim 16, wherein the flow constraints ensure that each time a use case is entered that the use case is also exited.

18. The method of claim 8, wherein the creating a constrained use case flow graph comprises creating actor constraints.

19. The method of claim 18, wherein the creating of actor constraints comprises arc-splitting the constrained use case flow graph such that each arc is divided for each actor capable of traversing that arc.

20. The method of claim 9, wherein the creating a constrained use case flow graph comprises creating pre-condition constraints.

21. The method of claim 20, wherein each of the pre-condition constraints determines in which state the tested system should be for a corresponding use case to be triggered.

22. The method of claim 9, wherein the creating a constrained use case flow graph comprises creating post-condition constraints.

23. The method of claim 22, wherein each of the post-condition constraints places a constraint on the system state after the corresponding use case is triggered.

24. The method of claim 7, wherein the deriving further comprises generating an optimization function based upon the use case flow graph.

25. The method of claim 24, wherein the optimization function and constraints define an integer linear programming problem.

26. The method of claim 24, wherein the generating of the minimal sized suite of test cases comprises solving the integer linear programming problem.

27. A system that generates a minimal sized suite of test cases comprising:
- a use case modeler that provides a use case model of the system to be tested:
- a parser that parses the use case model to generate a master use case flow graph and at least one use case flow graph;
- a creater that creates a constrained use case flow graph based upon the use case model:
- a deriver that derives a set of use case model coverage constraints;
- and a generator that generates a minimal sized suite of test cases based upon the set of use case coverage constraints.

28. A system that generates a minimal sized suite of test cases comprising:
- means for providing a use case model of the system to be tested;
- means for parsing the use case model to aenerate a master use case flow graph and at least one use case flow graph;
- means for creating a constrained use case flow graph based upon the use case model;
- means for deriving a set of use case model coverage constraints; and
- means for generating said minimal sized suite of test cases based upon the set of use case coverage constraints.

29. A recording medium tangibly embodying a program of machine-readable instructions executable by a digital processing apparatus to perform a method of generating a minimal sized suite of test cases, comprising:
- providing a use case model of the system to be tested;
- parsing the use case model to generate a master use case flow graph and at least one use case flow graph;
- creating a constrained use case flow graph based upon the use case model;
- deriving a set of use case model coverage constraints; and
- generating said minimal sized suite of test cases based unon the set of use case coverage constraints.

30. A method for generating a minimal sized suite of test cases comprising: providing, by a computer, a use case model of the system to be tested;
- parsing, by said computer, the use case model to generate a master use case flow graph and at least one use case flow graph based on the model;
- creating, by said computer, a constrained use case flow graph based upon the use case flow graph;
- generating, by said computer, said minimal sized suite of teat cases based upon the constrained use case flow graph;
- generating, by said computer, a minimalization function based upon the constrained use case flow graph,
- wherein the number of arcs within the constrained use case flow graph ensures that every variation for each use case is used at least once and that each arc is traversed once,
- wherein the creating the constrained use flow graph comprises creating actor constraints, pre-condition constraints, and post-condition constraints,
- wherein the minimalization function and constraints define an integer linear programming problem, and
- wherein the generating of the minimal sized suite of test cases comprises solving the integer linear programming problem.

* * * * *